Dec. 22, 1959  S. WEBSTER ET AL  2,918,642
NONLINEAR VARIABLE RESISTOR
Filed March 27, 1957
Fig. 1.
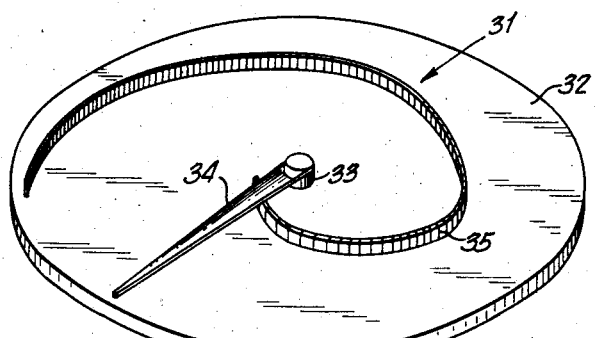
Fig. 2.
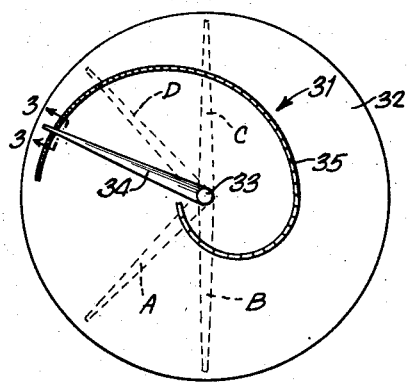
Fig. 3.  Fig. 4.
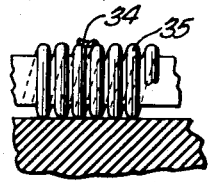 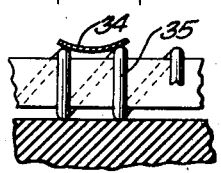
Fig. 5.
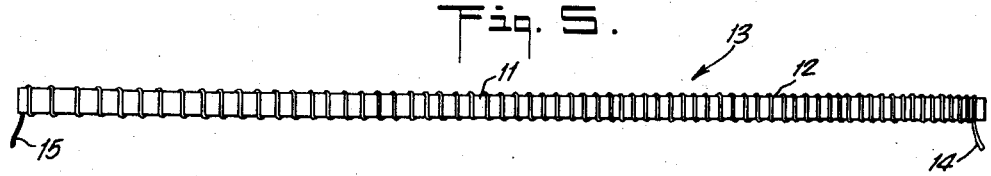
Fig. 6.
INVENTORS
STOKELY WEBSTER
CLARE E. BARKALOW
BY
ATTORNEY

United States Patent Office 2,918,642
Patented Dec. 22, 1959

2,918,642
NONLINEAR VARIABLE RESISTOR

Stokely Webster and Clare E. Barkalow, Huntington, N.Y., assignors, by mesne assignments, to United Aircraft Corporation, East Hartford, Conn., a corporation of Delaware Application March 27, 1957, Serial No. 648,921

8 Claims. (Cl. 338—89)

Our invention relates to a nonlinear variable resistor having a large range of variation.

Where a wide range of nonlinear variation in the resistance increments of a variable resistor is desired, there have been various physical problems involved in its construction. For example, in a wire-wound resistor, variation of the resistance along the length thereof may be had by means of varying the pitch of the windings. However, it has been found that the physical limitations encountered in connection with the pitch or spacing between turns of the windings impose a definite limitation on the extent of the range of variation in resistance that may be had. In like manner, where a tapered support is employed on which the winding of a wire-wound resistor is effectuated, the magnitude of taper will impose a limitation. Similarly, the size limitations for a practical construction may become a limiting factor. For example, a desired range of variation over the length of a resistor constructed of variable density, conductive material may render the density of the material such that the adequacy of the electrical contact by the wiper arm will be excessively impaired.

In accordance with our invention, a variable pitch winding for a wire-wound resistor or a taper on the support on which the resistor is wound, as well as a combination of the two, may be given an added range of variation by varying the radial distance from a wiper arm pivot to the contact surface of the wire-wound resistor. In addition to being able to cumulate these various means of producing desired added range of variation in the resistance range involved, use of our invention makes feasible a range not heretofore possible because of the construction and arrangement involving a wiper arm having a wide or broad surfaced wiping area near its pivot while varying in a tapering manner down to a desired narrow and small area contact surface. This wiper arm will therefore have a large radius of curvature near its pivot. This radius of curvature varies in a decreasing manner to a smaller radius of curvature at the tip of the arm. Consequently, the wiper arm will bridge the gap between turns of the variable pitch resistor in a constant manner whether the gap is wide or narrow, since the large radius of curvature will be located where the gap between turns is great and the small radius of curvature will be located where the gap is small.

Our nonlinear variable resistor may be connected as a rheostat by impressing a potential between the arm and one terminal of the resistor winding. In this manner, as the wiper arm is rotated, the value of the resistance in the circuit will be varied without opening the circuit. Our variable resistor may be connected as a potentiometer by impressing a voltage source across the end terminals of the resistor winding. In this case, the output circuit is connected between one end terminal of the resistor winding and the wiper arm, thus giving voltage dividing action.

One object of our invention is to provide a nonlinear variable resistor having an extreme range of variation.

Another object of our invention is to provide a nonlinear variable resistor in which variation in resistance is obtained by a helical disposition of the resistor winding support.

A further object of our invention is to provide a nonlinear variable resistor in which the resistance included in the circuit for a given position of the wiper arm depends not only on the pitch of the windings, but also on the taper of the support for the resistance wire.

A further object of our invention is to provide a nonlinear variable resistor having a variable pitch between windings of the resistance wire together with means for maintaining uniform contact of a wiper arm with the resistor winding.

Still another object of our invention is to provide a variable pitch resistance element having cooperating therewith a wiper arm of varying width.

Other and further objects of our invention will appear from the following description.

In general, our invention contemplates the provision of a resistor winding having variable pitch disposed along the locus of a spiral or other geometric figure having a predetermined desired variation with respect to a fixed, predetermined point. If desired, the support for the resistor winding may be tapered and the winding be of uniform pitch. Similarly, the support for the resistor winding may be tapered and the resistor winding may be wound with a varying pitch, the pitch being greatest in the area of the narrowest dimension of the support. A conducting wiper arm is arranged for rotation about the fixed point. It is adapted to make contact with the winding of greatest pitch most nearly adjacent the axis of rotation. As the wiper arm rotates, the radius of the wiper arm becomes greater and greater until it presents the longest distance in contact with the windings of smallest pitch. In this position, the resistance is the greatest. An additional variable may be achieved by tapering the wiper arm so that it has a narrow width at its outer extremity and a broader width adjacent the axis of rotation. It will readily be seen that when the wiper arm contacts the variable resistor winding closely adjacent the axis of rotation, the resistance is at a minimum and that the resistance of the resistor of our invention will vary in accordance with a predetermined law sharply to a point of maximum resistance.

In the accompanying drawings which form part of the instant specification and which are to be read in conjunction therewith and in which like reference numerals are used to indicate like parts in the various views:

Figure 1 is a perspective diagrammatic view showing a nonlinear variable resistor showing one embodiment of our invention.

Figure 2 is a plan view somewhat reduced in scale of the variable resistor shown in Figure 1.

Figure 3 is an enlarged elevation partly in cross section, taken along the line 3—3 of Figure 2.

Figure 4 is a view similar to that of Figure 3 but taken near the axis of rotation of the wiper arm showing the contact of the wiper arm with windings of the resistor when the arm is in the dotted-line position A, shown in Figure 2.

Figure 5 is a developed view of a wire-wound resistor having a variable pitch winding on a support of constant dimension.

Figure 6 is a developed view of a wire-wound resistor having a tapered support and a constant pitch winding.

It will be appreciated by one skilled in the art that there are various ways of obtaining a variation in the resistance increments of a resistor along the length thereof. One such variation (when a wire-wound resistor is employed) is illustrated in Figure 5 where there is a support 11 that has a resistance wire 12 wound thereon.

Together, the support 11 and resistance wire-winding 12 constitute a resistor, indicated generally by the reference numeral 13, having wire ends or terminals 14 and 15. Variation in the resistance for a given length along resistor 13 is had by changing the pitch of the winding of resistance wire 12. The pitch of a resistor winding consists of the distance from center to center of adjacent turns of the resistance wire.

Another method of obtaining a variation along the length of a wire-wound resistor is to employ a tapered support as illustrated in Figure 6 where a support 20 has wound thereon a resistance wire 21 having terminals or ends 22 and 23, all these elements together making up a complete resistor indicated generally by the reference numeral 24. It will be observed that in order to gain a greater degree of variation in the amount of resistance change per unit length of travel along the resistor, such as resistor 13 or resistor 24, the two types of variation may be combined by employing a variable pitch winding such as that illustrated by resistance wire 12 with a tapered support such as the support 20 shown in Figure 6.

In addition to this means of increasing the range of variation of resistance increments over the length of a given resistor, the range of variation may be increased still further by mounting the resistor in a manner illustrated in Figures 1 and 2. As there shown, there is a resistor, indicated generally by the reference numeral 31, that is fastened in a spiral manner on a supporting disk 32 of insulating material. There is a centrally located shaft 33 that has securely attached thereto for rotation therewith a tapered wiper arm 34 of conducting material of predetermined resistance. The wiper arm 34 is arranged for relative rotation with respect to the supporting disk 32 and the resistor 31 carried thereby.

The wiper arm 34 may have any desirable configuration such that there is a wide, large radius of curvature contact surface near the shaft 33 which varies in a desirable manner to a relatively narrow, small radius of curvature contact surface. The arm 34 illustrated may be constructed of any good conducting material, for example, Phosphor bronze. The arm 34, it will be observed, changes in width radially agreeable to the change in pitch of the windings. It may have a dish-shaped configuration when viewed in cross section, as shown in Figures 3 and 4.

The result of mounting the resistor in a spiral manner as illustrated in Figures 1 and 2 is to gain an added range of variation resulting from the variation in radial distance of the resistor 31 from the axis of the wiper shaft 33. This variation in radial distance means that for a given angular displacement of the shaft 33, the lineal travel of the wiper arm 34 over the surface of the resistor 31 will vary depending upon the portion of the resistor that is being wiped by the arm 34. For example, referring to Figure 2, it may be observed that the lineal travel of the arm 34 over the contacted surface of the resistor 31 (disregarding the change in pitch of winding 35), in traveling from position A to position B is less than one-third the lineal travel had when the arm 34 is rotated from position C to position D. While the angular displacement of the shaft 33 and wiper arm 34 in each case, for example, from position A to position B is the same as that from position C to position D, it will be observed that a longer length of the resistance element will be traversed as the radius increases. Therefore, a variation in the resistance change being effectuated for a given angular displacement of the shaft 33 would be had, even though the resistor 31 were linear in its resistance characteristics, and an extreme variation may be had where, as shown, the resistor 31 has a variable resistance characteristic.

It has been discovered that full advantage may be taken of a most extreme range of variation if the radius of curvature for the contact surface of the wiper is made variable in order to maintain best resolution and uninterrupted contact with the resistor over its full length. It is to be noted that in connection with wire-bound resistors a slider arm should desirably have a minimum radius of curvature, in order to provide best tolerance to "high wires," that is, turns projecting above adjacent turns, and thus improve the resolution. However, where the turns are widely spaced, the radius of curvature must be large enough to avoid loss of continuity between turns. Thus, the excellent results may be obtained whereby satisfactory contact may be had with the widely spaced turns of a resistance wire 35 on resistor 31, as shown in Figure 4. A correspondingly satisfactory contact between the wiper arm 34 and adjacent turns of the resistance winding 35 where the pitch is small may be had, as shown in Figure 3. In this manner, very accurate and electrically satisfactory changes in resistance increments at different positions of the wiper arm 34 may be obtained with the same degree of accuracy and good electrical contact throughout the entire range of operation of the variable resistor. This is especially beneficial to the ability of obtaining an extreme range of variation, because heretofore the spacing between windings, for example, the pitch of the winding of the resistor, definitely limited the resistance variation at one end of a wire-wound resistor, since the wiper contactor would begin to interrupt the circuit.

In like manner, our invention contemplates the use of other types of resistors than wire-wound resistors, since the variation in contact conditions between the wiper arm and the resistor will be analogous. For example, where a resistor having conductive material of variable density (not shown since this is known in the art) is employed, the density of such conductive material will directly affect the ability of a wiper arm to make satisfactory electrical contact. Consequently, by using the construction of our invention, a wide area contact surface for the wiper arm may be employed at the low density end of the resistor, while a variation in the contact area of the wiper arm may be had to correspond to the variation in the density of the conductive material in such a way that the efficiency of the electrical contact being made by the wiper arm will remain consistently good over the entire range of positions of the wiper arm without any loss in sensitivity or in current-carrying ability.

In this manner, advantage may be taken of a narrow, small area contact surface on the wiper arm to cooperate with closely spaced turns of a wire-wound resistor or with the high density end of a resistor made of conductive material of variable density, so that maximum sensitivity may be maintained all the way to the high resistance increment end of the resistor.

It will be seen that we have accomplished the objects of our invention. We have provided a nonlinear variable resistor having extreme range of variation and in which the variation in resistance is obtained by a helical disposition of the resistor winding support. The resistance of our nonlinear variable resistor for a given position of the wiper arm is a function not only of the winding pitch, but also of the taper of the resistance wire support. Our resistor has a variable pitch between the resistance wire windings and means for maintaining uniform wiper arm contact with the resistor winding. A wiper arm of varying width cooperates with a variable pitch resistance of our resistor.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A nonlinear variable resistor comprising an element having variable resistance per unit length and correspondingly variable slide arm contact characteristics, a variable characteristic contact surface wiper arm pivoted adjacent one end thereof for making contact with said element, and means for mounting said element in a spiral configuration about the pivotal axis of the wiper arm in order to cause the element to be contacted by the wiper arm progressively over the variable contact surface thereof in correspondence with the variation in contact characteristics.

2. A nonlinear variable resistor comprising an element having a variable resistance per unit length and correspondingly variable slide arm contact characteristics, a tapered contact surface wiper arm pivoted adjacent the wide end thereof for making contact with the element, and means for mounting the element in the form of a spiral about the pivotal axis of said wiper arm, said spiral being so constructed and arranged that the smallest increments of variation in the resistance of the element are located closest to the pivotal axis and will be contacted by the widest end of the wiper arm contact surface.

3. A nonlinear variable resistor comprising a variable pitch wire-wound element, a variable radius of curvature wiper arm varying a corresponding amount as the pitch of the element, and means for causing the wiper arm to contact said element progressively over the variable radius of curvature of the wiper arm in correspondence with the variable pitch of the winding of said element in order to effectively take advantage of a wide range of variation in resistance value per unit length of the element.

4. A nonlinear variable resistor comprising a variable pitch wire-wound element, a variable radius of curvature wiper arm pivoted adjacent one end thereof and varying a corresponding amount as the pitch of said element, and means for causing the wiper arm to contact said element progressively over the variable radius of curvature of the wiper arm in correspondence with the variable pitch of the winding of said element in order to effectively take advantage of a wide range of variation in resistance value per unit length of the element.

5. An nonlinear variable resistor including in combination a variable pitch wire-wound resistive element, a variable width wiper arm having a variable radius of curvature, said arm being pivoted adjacent one end thereof and varying a corresponding amount as the pitch of said element, and means for mounting said element in a spiral configuration about the pivotal axis of the wiper arm in order to cause the element to be contacted by the wiper arm progressively over the variable radius of curvature thereof in correspondence with the variable pitch of the winding of the element.

6. A nonlinear variable resistor comprising a variable pitch wire-wound element, a tapered contact area wiper arm having a correspondingly variable radius of curvature, said arm being pivoted adjacent the wide end thereof for making contact with the element, and means for mounting the element in the form of a spiral about the pivotal axis of the wiper arm, said spiral having a configuration such that the maximum pitch of the windings is located closest to the pivotal axis of the wiper arm where the contact area has maximum radius of curvature and the distance of the remainder of the element from said pivotal axis varies inversely as the pitch of the windings in correspondence with the taper of the wiper arm.

7. An extreme range nonlinear variable resistor including a wire-wound resistance element having a wide range of pitch variation of its windings, a tapered contact area wiper arm for making contact with the windings of the element, means for pivoting the wiper arm about the wide end of the tapered contact area, means for mounting the element with the contacted surface of the windings arranged in a spiral about the pivotal axis of the wiper arm, the spiral being of such a configuration that the contact area of the wiper arm will bridge adjacent turns of the windings of the element from the maximum pitch end to the minimum pitch end of the element.

8. In a resistor having a wire-wound resistance element, said element having a variable pitch winding, a variable width wiper arm having a correspondingly variable radius of curvature contact surface, a shaft for pivotally supporting the wiper arm near the wide end thereof, and means for supporting the element in a spiral manner around the shaft, the maximum pitch of the wire-wound resistance element being located closest to the shaft to be in contact with the maximum radius of curvature of the arm and the minimum pitch of the element being located furthest away from the shaft to be in contact with the minimum radius of curvature of the arm.

References Cited in the file of this patent

UNITED STATES PATENTS

| | | |
|---|---|---|
| 1,526,441 | Snell | Feb. 17, 1925 |
| 1,755,314 | Carter | Apr. 22, 1930 |
| 2,417,311 | Luck | Mar. 11, 1947 |
| 2,542,113 | Bowitz et al. | Feb. 20, 1951 |
| 2,744,986 | Caldwell | May 8, 1956 |

FOREIGN PATENTS

| | | |
|---|---|---|
| 409,379 | Great Britain | Apr. 30, 1934 |
| 737,429 | Germany | July 14, 1943 |